March 6, 1928.    1,661,799
G. G. GOING
TYPEWRITING MACHINE
Filed March 9, 1925     3 Sheets-Sheet 3
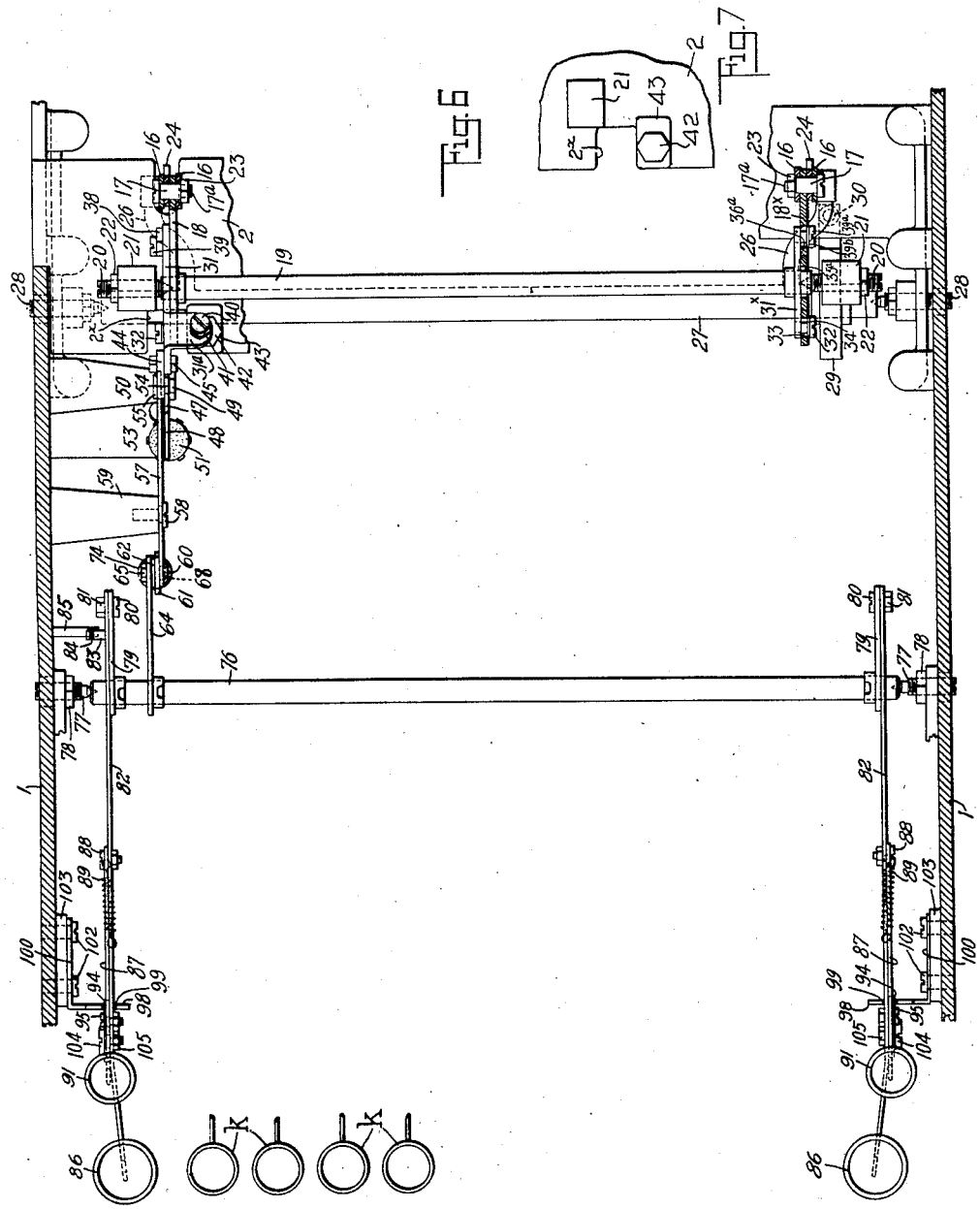
WITNESSES
Lillian Nelson
mw Pool
INVENTOR
George Gould Going
BY Jacob Felbel
ATTORNEY Patented Mar. 6, 1928.

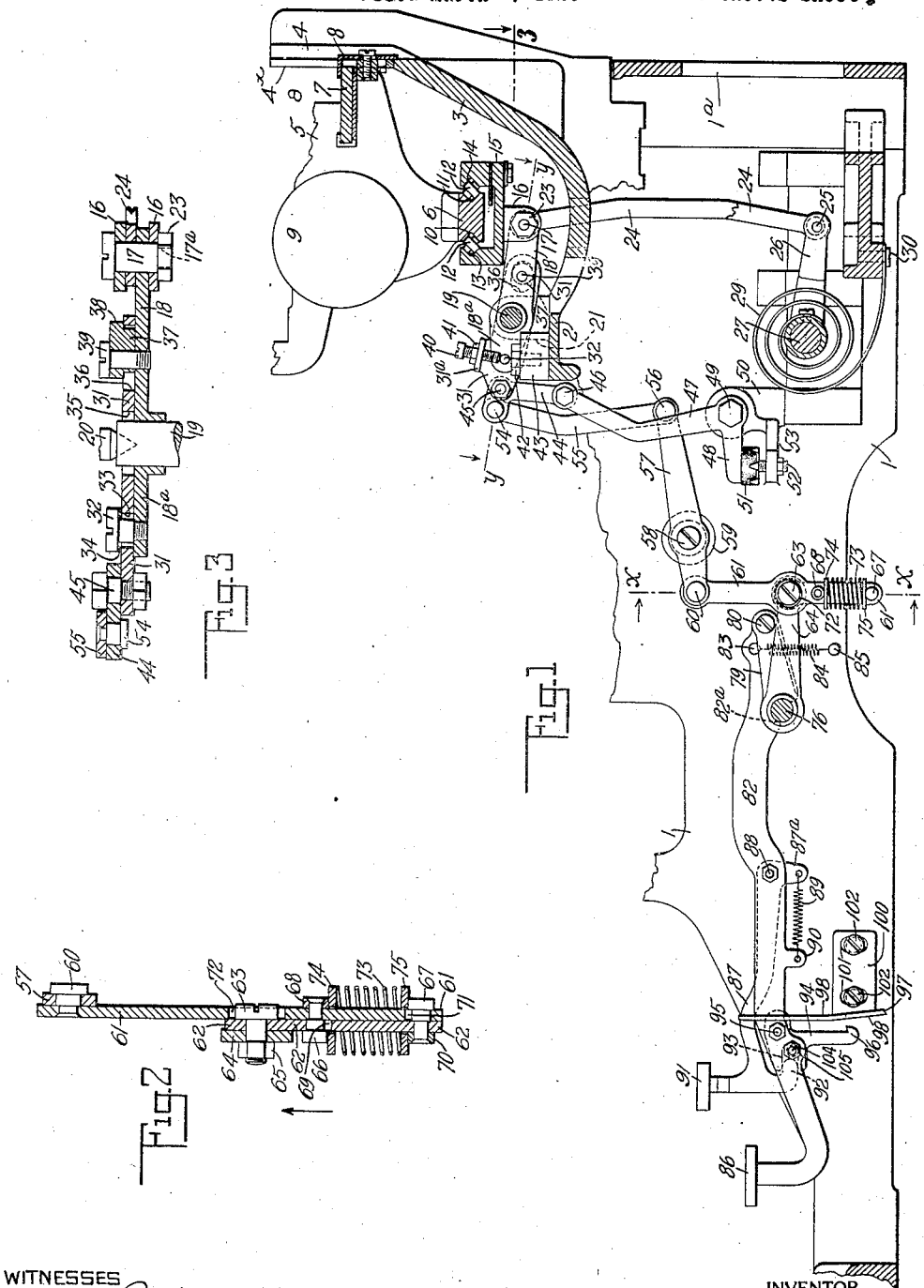

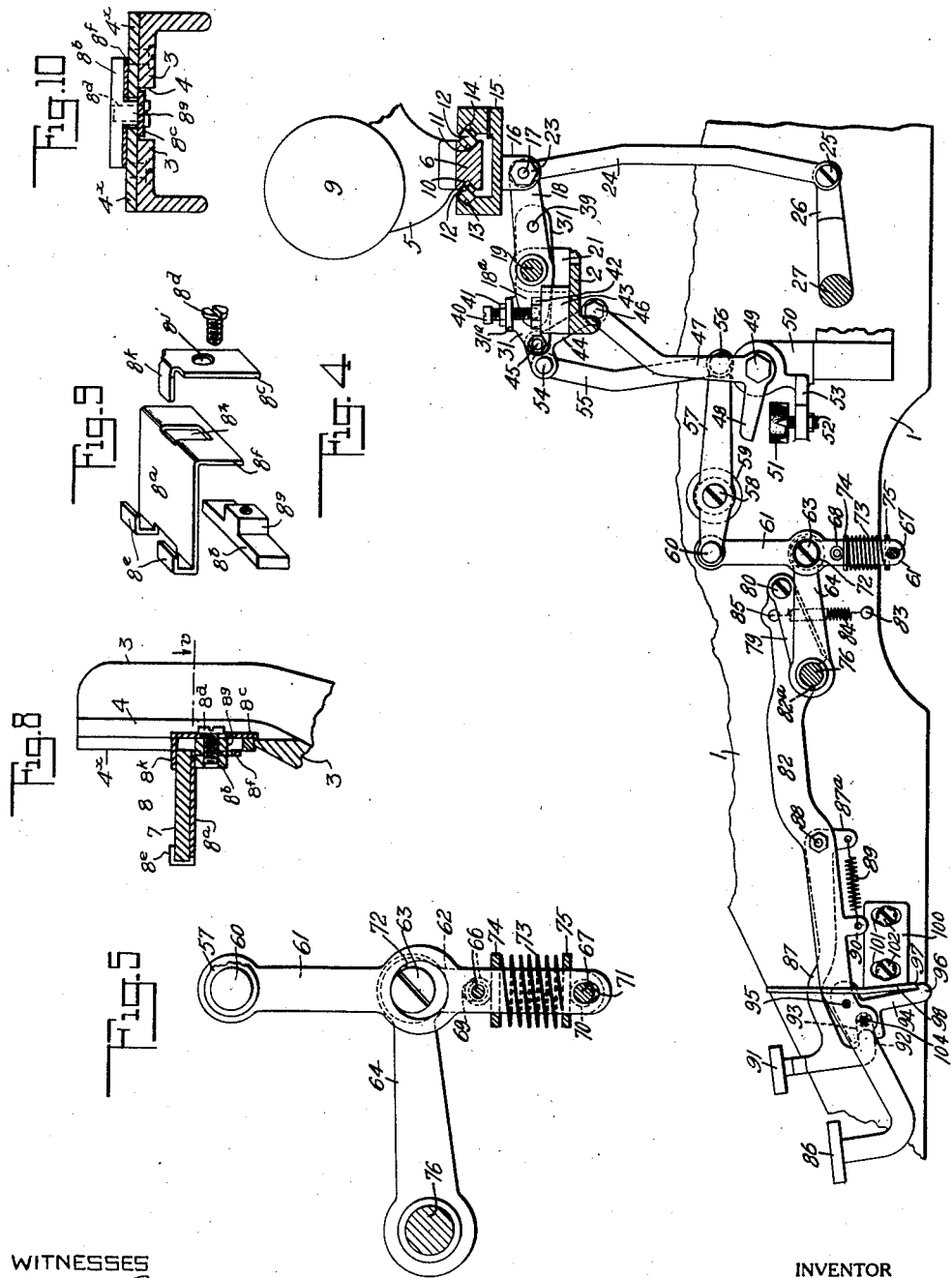

1,661,799

UNITED STATES PATENT OFFICE.

GEORGE GOULD GOING, OF MIDDLETOWN, CONNECTICUT, ASSIGNOR, BY MESNE ASSIGNMENTS, TO REMINGTON TYPEWRITER COMPANY, A CORPORATION OF NEW YORK.

TYPEWRITING MACHINE.

Application filed March 9, 1925. Serial No. 14,100.

My invention relates to case shifting mechanism for typewriting machines and its object is to provide new and improved mechanism of the character stated.

To the above and other ends which will hereinafter appear, my invention consists in the features of construction, combinations of devices and arrangements of parts hereinafter described and particularly pointed out in the claims.

In carrying out my invention, I provide two shift key levers arranged at opposite sides of the keyboard, each lever carrying both a temporary shift key and a shift locking key, which latter is effective to lock the shiftable member, in the present instance, the carriage, in shifted position. My invention is so constituted that when the shiftable member is thus locked in its shifted position as the result of the actuation of either shift lock key, said member may be unlocked or released and permitted to be restored to normal or lower case position by actuating either of the temporary shift keys. These last keys are secured to the shift key levers or lever members which are rigid on a common support or rock shaft, and furthermore, the shift lock keys are also supported through the shift key levers from the rock shaft. In order, therefore, that the temporary shift keys may be effective to release either set of shift locking devices, there is provided a novel yielding connection between the rock shaft and the shiftable member or carriage which permits the release without requiring any movement of the shift rail and carriage to effect it.

The invention will be described in detail in its present embodiment in connection with the accompanying drawings wherein Figure 1 is a fragmentary front-to-rear vertical sectional view of a No. 6 Remington-Noiseless typewriting machine embodying the preferred form of my invention.

Figure 2 is a vertical sectional view drawn to an enlarged scale and taken on a plane designated by the section line $x$—$x$ in Fig. 1 and looking in the direction of the arrows at said line.

Figure 3 is a substantially horizontal sectional view on an enlarged scale taken on a plane designated by the section line $y$—$y$ in Figure 1 and looking downward in the direction of the arrows at said line.

Figure 4 is a fragmentary vertical sectional view corresponding to Fig. 1 but omitting some of the parts shown in said Fig. 1 and showing other parts in different relationships.

Figure 5 is a fragmentary vertical elevation with some parts in section, said Fig. 5 showing certain of the elements of the case shifting train of devices.

Figure 6 is a fragmentary horizontal sectional view taken on a plane represented by the section line $z$ in Fig. 1 and looking downward in the direction of the arrow at said line.

Figure 7 is a fragmentary detail plan view of the notched center tie.

Figure 8 is an enlarged detail view, partly in vertical section, showing an element hereinafter referred to as a guide member.

Figure 9 is a perspective view showing the parts constituting the said guide member or element, said parts being shown in separated relation for the sake of clearness.

Figure 10 is a horizontal sectional view in the plane of the dotted line $v$ in Fig. 8.

As appears from Figs. 1 and 6, the main frame of the machine comprises side plates 1 which are connected together by means comprising a rear cross bar or plate $1^a$, and movably supported above the side plates is a cross frame or center tie 2 which is provided at its middle with a curved upward projection or extension 3 formed with a slot or guideway indicated at 4. The shiftable element or carriage comprises end plates or bars 5 and cross bars 6 and 7, the cross bar 7 being slidably connected with a guide member 8 which co-operates with the sides of the guideway 4 to guide the carriage during shifting movements all as previously embodied in the Noiseless typewriting machine. As clearly appears from Figs. 8, 9 and 10, the member or element 8 is constituted by four parts, $8^a$, $8^b$, $8^c$ and $8^d$, the part $8^d$ being a headed screw which detachably connects the four parts in rigid relationship and causes them to act as a single element or member. The body portion of the part $8^a$ is constructed to underlie the carriage bar 7, and is provided at its front edge with two hook portions $8^e$ which overlie the top front side of the bar 7. Projecting downward vertically from the rear of the body portion of the part $8^a$ is an extension $8^f$ which is arranged to co-act with the front face of a slotted guide plate $4^x$ detachably secured to the front of the extension 3 and with its vertical slot in register with the slot or guideway 4. The slot in the plate 4ˣ is slightly narrower than the guideway 4. The part or plate 8ʰ is arranged forward of the extension 8ᶠ and is provided at its middle with an enlargement or plug 8ᵍ which projects rearward through a square opening or slot-way 8ʰ in the extension 8ᶠ.

The enlargement 8ᵍ is formed with a threaded opening which receives the shank of the screw 8ᵈ, said screw passing through an enlarged opening 8ʲ in the part 8ᵉ and serving to clamp it adjustably against the face of the enlargement 8ᵍ. The part 8ᵉ co-operates with the rear face of the guide plate 4ˣ and is provided with an extension or tongue 8ᵏ projecting horizontally forward from its top and overlying the rear part of the carriage bar 7. The construction is such that during endwise movements of the carriage the bar 7 will slide through the member 8, the part 8ⁿ co-operating with the bottom of the bar 7 and the hooks 8ᵉ and 8ᵏ with its top, the rear edge of said bar 7 being held in contact with the front face of the guide plate 4ˣ by the hooks 8ᵉ. During endwise movements of the carriage, the member 8 is held from movement by reason of its engagement with the extension 3 and the guide plate 4ˣ. During case shifting movements, however, the carriage and the member 8 will move up and down together as a single member, and the element or member 8 being closely confined to its path of movement by reason of its co-operation with the guide-way 4 and the slotted guide-plate 4ˣ, will serve to guide and control the carriage at its rear portion during case shifting movements. During such movements the side edges of the part 8ᵉ will be confined between and controlled by the inner faces of the slot or guide-way 4, while the projection 8ᵏ will co-operate at its sides with the sides of the narrower slot in the guide plate 4ˣ, there being a loose but substantial fit between these several elements. The front face of the part 8ᵉ will during the case shifting movement co-operate with the rear face of the guide plate 4ˣ at the sides of the slot therein. The enlargement or plug 8ᵍ which is substantially square in cross section will co-operate at its sides during case shifting movements with the inner walls of the slot in the guide plate 4ˣ. Mounted on the carriage is a platen 9 with the front face whereof printing instrumentalities or type bars (not shown herein) are adapted to co-operate. The carriage bar 6 is oppositely grooved as indicated at 10 and 11 and seated in these grooves are roller bearings 12 which are also received in grooves 13 and 14 formed in the inner faces of a trough or shift rail 15 which may be made up of several parts as shown. Said rail while shift-able to change case is normally stationary in lower case position, and the platen and carriage aided by the bearings 12, travel back and forth endwise along it during printing operations.

Novel means are provided for shifting the guide rail or track bar 15 together with the carriage and platen in order to change case. To this end the bottom of the rail or grooved track bar 15 is provided with downwardly extending lugs or tabs 16 with which are pivotally connected at 17 rearwardly extending arms 18 and 18ˣ connected to the outer end portions of a rock shaft 19 which is depressed at its ends to receive the coned inner ends of pivot screws 20 that are supported in lugs 21 projecting upward from the cross bar or plate 2. The pivot screws 20 are adjustably secured in place by check nuts 22. The pivotal connection between the arms 18 and 18ˣ and the shift or guide rail 15 are best shown in Figs. 1, 3 and 6. The lugs or tabs 16 are bent or extended downward in pairs from the shift rail near its opposite ends, each pair of lugs receiving between them the rearwardly extending portion of the associate arm. Connecting each pair of lugs is the pivotal device 17 which is in the form of a headed shouldered screw having a reduced threaded portion 17ᵃ which receives a hexagonal securing nut 23. The arms 18 and 18ˣ are perforated to bear on the pivot portions of the screws 17 between the inner faces of the lugs 16. The pivot screws 17 also provide supports for the upper ends of links 24 which extend downward through openings in the bar or frame 2 and are adjustably connected at their lower ends at 25 to the free ends of crank arms 26 that are secured to a balancing or rock shaft 27 pivoted on stationary pivot screws 28. Coiled around the shaft 27 near its right-hand end is a counter-balancing spring 29, the inner end of which is adjustably secured to turn with the shaft and the outer end anchored by a screw 30 to a stationary part of the machine. The left-hand arm 18 is fixed directly to shaft 19 whereas the right-hand arm 18ˣ is adjustably connected thereto. In order to provide for properly connecting and adjusting the arms 18 and 18ˣ and their connections, there are associated with said arms other arms 31 and 31ˣ, the latter in the form of a double crank fixed to the shaft 19, said associate arms 31 and 31ˣ being connected to the arms 18 and 18ˣ by means comprising headed screws 32. Said screws pass through enlarged openings 33 in the arms 31 and 18ˣ and are threaded into the arms 18 and 31ˣ forward of the shaft 19, the screw heads co-operating with washers 34. The arm 31 is formed with an enlarged opening 35 surrounding the rock shaft 19 and its rear end has an enlarged opening 36 which receives an eccentric member 37 having a head 38 and adjustably secured to the arm 18 by a headed screw 39. The arm 31 is provided with an overhang or lip 31ᵃ which receives a stop screw 40 adjustably secured in place by a check nut 41, said screw being contactive with a headed stop member 42 secured in a lug or boss 43 on the tie or cross bar 2. The right-hand arm 18ˣ has an elongated opening 35ᵃ to fit over the shaft 19, and another elongated opening 36ᵃ which receives screw 39ᵃ threaded into the arm 31ˣ and having a washer 39ᵇ. The members or arms 18 and 31ˣ which are fixed to the shaft 19 constitute with their associate arms or elements 31 and 18ˣ, two-part lever members of the first order fulcrumed at 19, the parts or arms being relatively adjustable, such adjustments being readily effected after loosening the connecting or clamping screws. The parts of the left-hand lever member are primarily adjustable up and down while those of the right-hand member are adjustable substantially horizontally. When the parts are clamped together by their connecting and clamping screws, the two-part members of course act as a single part, rigid with the balancing shaft or rock shaft 19. When the screws clamping the parts of the left-hand lever member are loosened, rotary movement communicated to the eccentric 37 will be transmitted to the arm 18, 18ᵃ which will be turned or rotated together with the rock shaft 19 on the longitudinal axis of said rock shaft as a center. At this time the lever 31 will be held from movement under the impulse of the eccentric by the linkage or connections comprising the members 44, 47, 55 and 57. The rotary movement thus communicated to the rock shaft 19 will be transmitted by it to the right-hand two-part lever member. As a result, the shift rail 15 supported by the two lever members will be moved up or down, thus simultaneously raising or lowering the carriage at both ends. This adjustment is for the purpose of bringing the platen into correct alignment with the types. The relative fore-and-aft adjustment between the two parts of the right-hand lever member is for the purpose of causing the carriage bar 7 to contact evenly with the slotted guide plate 4ˣ across its full width. This gives a firm and solid support or backing for the platen under the blows of the types, and insures that manifolding operations may be successfully carried out.

The connection between the rock shaft 19 and the shift keys comprises an angular member or connector 44 pivoted at 45 to the forward portion of the left-hand arm 31. The longer arm of the member 44 is pivotally connected at its lower end at 46 to the angular upwardly extending arm 47 of a stop member which further comprises a short horizontally extending arm 48. The member 47, 48 is pivotally supported at 49 on a stationary projection 50. The arm 48 is adapted to contact with a sound deadening stop 51 carried by a support 52 which is adjustably secured in a stationary horizontal shelf-like part 53. The two stops 48 and 51 are normally in contact, as shown in Fig. 1, and determine the lower case or normal position of the shift rail, carriage and platen. The front edge of the bar 2 is slotted or cut-out as indicated at 2ˣ in order to afford movement of the parts 44 and 47 and their connection (Figs. 6 and 7).

The short arm of the angular member 44 has pivotally connected to it at 54 the upper end of a downwardly extending link 55, the lower end of which is pivotally connected at 56, to the rear arm of a lever 57 of the first order, said lever being fulcrumed on a pivot screw 58 which is threaded into a projection 59 extending inward from the left-hand frame plate 1. The lever 57 receives actuations from the shift keys, as hereinafter described, which actuations it transmits to the member or connector 44. Said connector has two functions; it controlling the movable stop or member 47, 48 and also transmitting movement from the lever 57 to the lever member 18, 31. From a consideration of Fig. 1, it will be understood that in the beginning of case shifting operations, the connector 44 first affects the member 47, 48, swinging it on its pivot 49 and causing the arm 47, acting through the pivot 46 to control and restrict the movement of the connector 44, causing it to transmit the pull of the link 55 to the platen carriage, this pull being transmitted to the lever member 18, 31 and thence to the shaft 19, shift rail and carriage.

The forward end of the lever 57 has pivotally connected to it by a shouldered rivet 60, the upper end of an arm 61, the pivotal connection being best shown in Fig. 2, from which it will be observed that the rivet 60 is shouldered and secured in the arm 61, the shouldered portion of the rivet bearing in an opening in the arm 57. The arm 61 constitutes one member of a yielding device or means which is one of the novel elements of my invention, another member of said means being constituted by a short arm 62 having a slidable, yielding, spring-pressed connection with the arm 61. The manner in which these two arms are connected is best illustrated in Fig. 2. From this figure it will be seen that the shorter arm 62 is pivotally supported through a shouldered screw 63 at its upper end on the free end of a crank arm 64, the screw 63 being secured in place by a nut 65. The slidable connection between the arms 61 and 62 comprises headed and shouldered rivets 66 and 67. The upper rivet 66 is fixedly secured to the arm 61, the shank of said rivet being fastened to an annulus or nut 68 arranged at the opposite side of said arm from the shoulder of the rivet. The construction is such that when the end of the shank is spread or upset the rivet is clamped in place, the inner straight face of the shoulder abutting against the face of the arm 61. The head of the rivet 66 is outside of the arm 62 while the body or shouldered portion of said rivet bears loosely in an elongated hole 69 in said arm 62. The lower rivet 67 is similarly supported but reversely from the rivet 66, being mounted on the arm 62 and secured in place thereon by an annulus or nut 70. The shouldered or body portion of the rivet 67 bears loosely in an elongated hole 71 in the arm 61. The holes and rivets are so related normally that the arm 62 may be moved upwardly or slide lengthwise of the arm 61 without the arm 61 being affected. To this end an enlarged opening 72 is provided in the arm 61 surrounding the head of the screw 63. The two arms are maintained in normal position or relationship by spring means which in the present instance comprises a wire spring 73 coiled around the lower portions of the arms 61 and 62 and confined between abutments or washers 74 and 75 which are somewhat larger in diameter than the spring coil. The upper washer 74 is limited in movement by the head of the rivet 66 and the nut or head 68, while the lower washer is limited or stopped by the head of the rivet 67 and the nut or detachable head 70. The spring 73 tends constantly to expand and thus maintains the washers 74 and 75 in contact with their limiting devices or stops.

The crank or arm 64 to which the arm 62 is connected is secured fixedly to a rock shaft 76 near its left-hand end, as clearly appears from Fig. 6. The rock shaft is pivoted at its ends on screw pivots 77 which are adjustably secured in the end plates 1 by means of check nuts 78. The rock shaft 76 is adapted to be rocked by the shift keys which are supported or mounted on it. Near the outer ends of the rock shaft are mounted in fixed relation thereto rearwardly extending crank arms 79, and to the outer end of each crank or arm 79 is fixedly connected, by means of screws 80 and clamping nuts 81, key lever members 82. Each key lever member extends forward from its clamping connection with the associate crank arm 79 and is cut out as indicated at 82ª to bear against the upper face of the rock shaft 76. The left-hand key lever member 82 is provided with a lateral pin 83 to which is connected the upper end of a coiled restoring spring 84, the lower end of said spring being anchored to a pin 85 projecting inward from the left-hand frame plate 1. At their forward ends the key lever members 82 are provided with shift keys 86 which are fixed on the members 82 and are effective when actuated to temporarily shift the carriage. The keys 86, it will be observed, are rigid with respect to the rock shaft 76 and are disposed at opposite sides of the keyboard, a few of the keys $k$ whereof are diagrammatically illustrated in Fig. 6. The method of securing the levers 82 to the rock shaft 76, besides being cheap, also promotes rigidity, as the arms 79 are welded to the shaft and provide secure anchorages for the levers 82 through the medium of the screws 80.

Each key lever member 82 carries or is provided with locking devices actuated by keys which are effective to move the shiftable element from normal to shifted position and to maintain it locked in such position. The locking devices comprise key carrying arms or key members 87 pivoted at 88 to the associate lever members 82, each key member having a tail portion 87ª to which is connected one end of a coiled spring 89, the other end of said spring being connected to a lug 90 on the member 82.

Each arm or member 87 carries fixed to it a shift lock key 91 which is disposed in rear of the associate temporary shift key 86. Below the key 91 each arm 87 is formed or provided with a rearwardly projecting nose 92 which engages in an open-mouthed slot 93 formed in a pivoted locking device or hook 94, thus providing a loose connection between the arm 87 and the locking hook. Said hook is pivoted at 95 on the associate lever member 82, its hook portion extending downward and terminating at its lower end in a hook proper, or engaging device 96. The device or hook 96 is adapted to co-act with the lower edge 97 of a plate-like member 98, the upper portion of which is formed with a vertical guide slot indicated at 99 which receives and guides the associate key lever member 82. Bent rearwardly from the member 98 is an ear 100 formed with slots 101 which receive headed screws 102 that are threaded into a boss 103 on the adjacent side plate 1 and adjustably secure the plate member or locking device 98, 100 to the frame of the machine. A stop screw 104 is secured to each member 82 by a nut 105, said stop screw being arranged within the slot 93 in the hook member 94. Normally the shift locking devices comprising the members 87 and 94 are maintained in the normal relation shown in Fig. 1 by the spring 89, the effect of said spring being transmitted through the engaging nose 92 to the upper edge of the slot 93, thus tending to swing the forward portion of the hook 94 upward and to maintain the lower edge of the slot 93 engaged with the stop screw 104. Also, the restoring spring 84 assists to maintain the train of case shifting devices in the normal position.

When it is desired temporarily to shift the platen to change case, as for printing a capital letter or other upper case character, either of the temporary shift keys 86 may be depressed, rocking the shaft 76 and swinging the crank arm or crank 64 upward, this movement being transmitted through the arms 62, 61 to the lever 57, which in turn through the link 55 and member 44 will actuate the two-part member 31, 18 at the left, thus rocking the shaft 19 and transmitting the movement to the corresponding two-part member at the right. As a result, the rail or track bar 15 is elevated and the carriage shifted upward to upper case position, this position being determined by contact of the stop 40 with the stop 42. During this case shifting movement, it will be understood that the normal relationship between the arms 61 and 62 is not affected, these parts acting substantially as a single part. Also the relationship between the parts 87 and 94 remains unchanged, although these parts will move bodily on the member 82. The carriage and platen will be maintained in shifted or upper case position so long as the actuated shift key 86 is held depressed. On the release of the key, the parts will be restored to normal position through the action of gravity and the restoring spring means.

When it is desired to shift the platen to upper case position and to maintain it locked in such position, either of the shift locking keys 91 may be actuated for this purpose. When one of such keys is depressed, as for example, the left-hand one, the first effect will be to swing the shift locking arm or member 87 downward on its pivot 88, overcoming the spring 89 and causing the nose 92 to swing the member 94 on its pivot 95. The movements will continue until the hook 96 contacts with the front face of the plate 98. Thereafter the pressure applied by the operator to the key 91 will be transmitted also to the lever member 82 and thence to the rock shaft 76, moving these parts and the train of case shifting devices as in the operation heretofore described in connection with the temporary shift. As soon as the hook 96 passes below the plate 98, it will snap under the locking edge 97, the parts being proportioned and related so that this will occur substantially at the end of the case shifting movement. The edge 97 is shaped so as to hold the hook 96 engaged as illustrated in Fig. 4, from which it will be observed that the locking devices will maintain the platen, carriage, shift rail and train of shifting devices in shifted position after pressure is withdrawn from the key 91. With the platen thus locked in upper case position, the printing of upper case characters may be continued as long as desired. It will be understood that during such printing the shift rail or track bar 15 will remain stationary in upper case position and that the carriage will travel along said bar or rail endwise, being guided and controlled through the rollers 12 during such traveling movements.

In order to release the carriage from its locked position, it is only necessary to actuate either of the temporary shift keys 86. Pressure on the key 86 will be transmitted to the rock shaft 76 and thence to the crank 64 which will be swung upward, carrying with it the arm 62 and compressing the spring 73, the upward tendency of movement of the arm 61 being resisted at this time by the train of devices comprising the lever 57, link 55 and member 44. The yielding connection between the arms 61 and 62 will afford relative movement between them as will be understood clearly from a comparison of Figs. 2 and 5, the latter figure showing the crank 64 and the arm 62 shifted upward with reference to the arm 61 which will not be moved but, as shown, occupies the same position in both figures. The movement thus communicated to the arms or members 82 and the rock shaft 76 will also be of course transmitted to the locking devices 87 and 94, with the result that the engaged hook proper 96 will be swung downward out of contact with the interlocking edge 97. As soon as the hook clears the edge 97, the member 94 will be swung forward out of line with the plate 98 through the action of the spring 89, so that on releasing the depressed key 86, the parts will be restored to normal or lower case position as before. This additional movement communicated by the key 86 to the rock shaft 76 for the purpose of releasing the locking devices will not affect the carriage, the platen, the shift rail, or any of the shifting train between the rail and the member 61.

It will be observed that by the employment of my invention I have provided two sets of shift locking devices, each controlled by its own key, and that I also provide for unlocking either of said sets by operating either of two unlocking keys, these unlocking keys, i. e., the temporary shift keys 86, effecting the unlocking without the necessity of employing power sufficient to lift or raise the platen, the carriage, the shift rail and the major part of the case shifting mechanism. In other words, it is only necessary to apply sufficient power slightly to compress the spring 73. Furthermore, the novel yielding devices which enable this result to be effected in the present instance have the additional advantage of providing an agreeable cushioning effect for all of the four keys that may be operated to cause case shifting movements.

Various changes may be made without departing from my invention.

What I claim as new and desire to secure by Letters Patent, is:—

1. In case shift mechanism for typewriting machines, the combination of a shiftable element, two shift key lever members, a train of connections between said lever members and said element comprising yielding devices for affording lost motion between said lever members and said element, locking members mounted on said lever members and each provided with a locking key, and stationary devices engageable by said locking members under control of said locking keys, each of said shift key lever members being effective to release both of said locking members from engagement with said stationary devices, said yielding devices operating during such releasing operations.

2. In case shift mechanism for typewriting machines, the combination of a shiftable element, two shift key lever members, a train of connections between said lever members and said element comprising yielding devices for affording lost motion between said lever members and said element, locking hooks pivoted on said key lever members and each provided with a locking key, and stationary projections engageable by said hooks to lock said shiftable element in shifted position, each shift key lever member being effective to unlock both hooks, said yielding devices operating during the unlocking of said hooks.

3. In a typewriting machine, the combination of a shiftable element, means for shifting said element comprising a rock shaft, connections between said rock shaft and said element, arms fixed to said rock shaft, shift keys on said arms, and locks associated with said arms for maintaining said element locked in shifted position, said connections comprising yielding devices for affording rotary movement of said rock shaft to release said locks.

4. In a typewriting machine, the combination of a shiftable element; and means for shifting said element comprising a rock shaft, crank arms fixed to said rock shaft, shift keys connected to certain of said crank arms, and a yielding connection between another of said crank arms and said shiftable element.

5. In a typewriting machine, the combination of a shiftable element, a rock shaft, a pair of crank arms fixedly secured to said rock shaft near its opposite ends, shift keys one connected to each of said crank arms, a third crank arm fixed to said rock shaft, and a train of connections between said third crank arm and said shiftable element, said train comprising two arms having a spring pressed connection.

6. In a typewriting machine, the combination of a shiftable element, a rock shaft, a pair of crank arms fixedly secured to said rock shaft near its opposite ends, key lever arms secured to said crank arms, and bearing on said rock shaft, each key lever arm being provided with a shift key, a third crank arm fixed to said rock shaft, a train of connections between said third crank arm and said shiftable element, said train comprising two arms having a spring pressed connection, and sets of shift lock devices, one set associated with each of said key lever arms.

7. In a typewriting machine, the combination of a shiftabde element, means for shifting said element comprising a key operated rock shaft, a lock effective on said shaft, a key having a constant relationship with said shaft, and means for affording movement of said shaft by said key to release said rock shaft without directly affecting said shiftable element.

8. In a typewriting machine, the combination of a shiftable element, means for shifting said element comprising a rock shaft, connections between said rock shaft and said element, shift locking devices effective on said rock shaft near one of its ends, and a key rigidly connected to said rock shaft near its opposite end, said connection comprising yielding devices operating to permit said key to release said locking devices without affecting said shiftable element.

9. In a typewriting machine, the combination of a platen, a traveling carriage, a shiftable guide rail for said carriage, a rock shaft, shift keys rigidly connected to said rock shaft, a crank arm fixed to said rock shaft, an arm pivotally connected to said crank arm, a second arm having a spring-pressed connection with said pivotally connected arm, and connections between said second arm and said shiftable guide rail.

10. In a typewriting machine, the combination of a carriage, a platen thereon, a guide rail, roller bearings between said carriage and said guide rail, a rock shaft, shift keys rigidly connected to said rock shaft, a crank arm on said rock shaft, an arm supported by said crank arm, a second arm slidably connected to said last recited arm, spring means for maintaining the slidably connected arms in normal relationship, and connections between said second arm and said guide rail.

11. In a typewriting machine, the combination of a shiftable element, a rock shaft, shift keys rigidly connected to said rock shaft, a crank fixed to said rock shaft, an arm pivotally connected to said crank, a second arm, pin and slot devices slidably connecting said arms, a coiled expansion spring surrounding said slidably connected arms, washers supported by said arms and between which said spring is confined, and connections between said second arm and said shiftable element.

12. In a typewriting machine, the combination of a shiftable element, a rock shaft, shift keys rigidly connected to said rock shaft, a crank fixed to said rock shaft, an arm pivotally connected to said crank, a second arm, pin and slot devices slidably connecting said arms, a coiled expansion spring surrounding said slidably connected arms, washers between which said spring is confined, a lever to which said second arm is connected, a link connected to said lever, a second rock shaft, and lever members thereon connected to said shiftable element, said link being connected to one of said lever members.

13. In a typewriting machine, the combination of a shiftable carriage, a rock shaft, shift keys rigidly connected to said rock shaft, a crank fixed to said rock shaft, an arm pivotally connected to said crank, a second arm slidably connected to said first arm, a coiled expansion spring surrounding said slidably connected arms, washers supported by said slidably connected arms and between which said spring is confined, a lever to which said second arm is connected, a link connected to said lever, a second rock shaft, lever members thereon comprising relatively adjustable parts, one lever member being connected to said link, a track bar shiftably supported by said lever members, and roller bearings connecting said track bar with said shiftable carriage.

14. In a typewriting machine, the combination of a platen, a traveling carriage therefor, a key actuated rock shaft, a crank arm thereon, a lever yieldingly connected to said crank arm, a link connected to said lever, a second rock shaft, two-part lever members thereon, means for affording relative adjustment of the parts of said lever members, an adjustable stop on one lever member, and said link being connected to said last named lever member, a track bar horizontally arranged and shiftably supported by said lever members, and roller bearings connecting said track bar with said carriage.

15. In case shifting mechanism for typewriting machines, the combination of a shiftable element, a train of devices including a shift key lever member effective to shift said element temporarily, and shift locking devices comprising an arm pivoted to said member and provided with a locking key and also with an engaging nose, a spring connecting said member and said arm, a hook also pivoted to said member and formed with a slot engageable by said nose, a stop on said member for said hook, and a stationary abutment engageable by said hook.

16. In a typewriting machine, the combination of a shiftable element, stop means including a movable stop determining the normal position of said element, a shift key, a connector between said shiftable element and said key, means connecting said connector with said movable stop, and a train of devices between said key and said connector.

17. In a typewriting machine, the combination of a shiftable element, a movable stop therefor, case shifting devices, and a connector between said stop and said devices, said connector being effective to move said stop and in combination with said stop to transmit case-shifting movements to said shiftable element.

18. In a typewriting machine, the combination of a shiftable platen, a shift key, a train of devices connecting said key to said platen including an angular pivoted member pivotally connecting with said train, a movable stop pivotally connected to one arm of said member, and a stationary stop with which said movable stop normally contacts to determine the normal position of said platen, said member moving said movable stop and also assisting to shift said platen.

Signed at Middletown, in the county of Middlesex, and State of Connecticut, this fifth day of March, A. D. 1925.

GEORGE GOULD GOING.